(12) United States Patent
Li

(10) Patent No.: US 8,027,582 B2
(45) Date of Patent: Sep. 27, 2011

(54) AUTOFOCUS WITH CONFIDENCE MEASURE

(75) Inventor: Pingshan Li, Sunnyvale, CA (US)

(73) Assignee: Sony Corporation, Tokyo (JP)

( * ) Notice: Subject to any disclaimer, the term of this patent is extended or adjusted under 35 U.S.C. 154(b) by 99 days.

(21) Appl. No.: 12/643,802

(22) Filed: Dec. 21, 2009

(65) Prior Publication Data

US 2011/0150447 A1     Jun. 23, 2011

(51) Int. Cl.
*G03B 3/00*     (2006.01)
*G03B 13/00*     (2006.01)

(52) U.S. Cl. ........................................ 396/104; 348/349

(58) Field of Classification Search .................. 396/89, 396/104, 125, 128; 348/345, 349; 382/255; 250/201.2

See application file for complete search history.

(56) References Cited

U.S. PATENT DOCUMENTS

| | | | |
|---|---|---|---|
| 6,456,737 | B1 | 9/2002 | Woodfill et al. |
| 7,187,413 | B2 | 3/2007 | Alderson |
| 7,616,254 | B2 * | 11/2009 | Wong et al. .................. 348/349 |
| 2006/0256229 | A1 | 11/2006 | Wernersson |
| 2007/0014468 | A1 | 1/2007 | Gines et al. |
| 2007/0019883 | A1 | 1/2007 | Wong et al. |
| 2007/0036427 | A1 | 2/2007 | Nakamura et al. |
| 2007/0189750 | A1 | 8/2007 | Wong et al. |
| 2007/0216765 | A1 | 9/2007 | Wong et al. |
| 2007/0297784 | A1 | 12/2007 | Wong et al. |
| 2008/0007626 | A1 | 1/2008 | Wernersson |
| 2008/0080846 | A1 | 4/2008 | Grip |
| 2008/0089598 | A1 | 4/2008 | George et al. |
| 2008/0107411 | A1 | 5/2008 | Hope |
| 2009/0015681 | A1 | 1/2009 | Pipkorn |
| 2009/0186655 | A1 | 7/2009 | Wernersson |
| 2009/0268985 | A1 | 10/2009 | Wong et al. |

FOREIGN PATENT DOCUMENTS

| | | |
|---|---|---|
| JP | 2002010126 A2 | 1/2002 |
| WO | 2007/022329 A2 | 2/2007 |

OTHER PUBLICATIONS

Baba, M. et al.—"A thin lens based camera model for depth estimation from defocus and translation by zooming"—Proceedings of the 15th International Conference on Vision Interface, Calgary, Canada (2002).

Yao, Yi et al.—"Auto-focusing in extreme zoom surveillance: a system approach with application to faces"—Advances in Visual Computing, Second International Symposium, ISVC 2006, Lake Tahoe, NV, USA; Nov. 6-8, 2006 Proceedings, Part 1 2006.

U.S. Appl. No. 12/242,805, filed Sep. 30, 2008—"Fast Camera Auto-Focus".

Ziou, D. et al.—"Depth from Defocus Estimation in Spatial Domain"—Computer Vision and Image Understanding, vol. 81, No. 2, Feb. 1, 2001, pp. 143-165.

* cited by examiner

*Primary Examiner* — Clayton E Laballe
*Assistant Examiner* — Minh Phan
(74) *Attorney, Agent, or Firm* — John P. O'Banion

(57) ABSTRACT

Autofocusing is performed in response to a weighted sum of previous blur difference depth estimates at each focus adjustment iteration. Variance is also determined across both past and present estimations providing a confidence measure on the present focus position for the given picture. Focus adjustment is repeated until the variance is sufficiently low as to indicate confidence that a proper focus has been attained. The method provides more accurate and rapid focusing than achieved by the best current depth-based techniques, such as those utilizing most recent depth estimation to determine the next lens position. In contrast to this, the present apparatus and method combines all previous depth estimation results in the autofocus process to determine the next lens position based on statistical models and confidence measure.

20 Claims, 12 Drawing Sheets

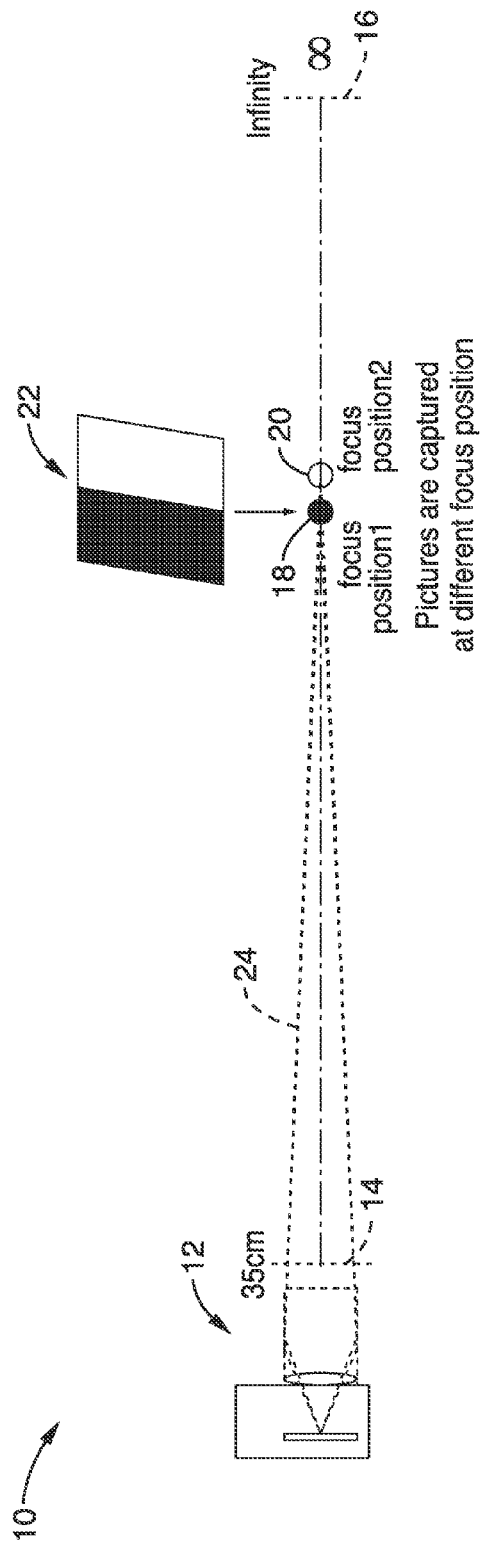
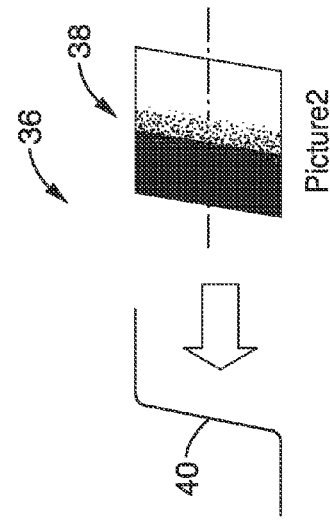
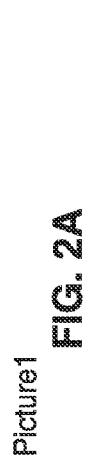
FIG. 1
FIG. 2A
FIG. 2B

AUTOFOCUS WITH CONFIDENCE MEASURE

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to image acquisition, and more particularly to automatic image focusing mechanisms.

2. Description of Related Art

Cameras and other optical devices typically provide an automated mechanism for obtaining a correct focus on the subject. Usually the autofocus (AF) is engaged in response to partially pressing the shutter-trigger, such as half-way. In some cases the autofocus feature continuously maintains focus, prior to capturing the image, or while capturing an image sequence or video.

It will be appreciated that during autofocus the camera lens is automatically focusing on a three-dimensional scene and the focus is controlled with respect to depth. Numerous autofocus mechanisms are known in the art. One traditional autofocus scheme searches for the peak of the autofocus curve. In one embodiment, a camera utilizes the autofocus curve from image gradients. As the region of analysis becomes increasingly focused, the image gradients become increasingly larger. The objective of the autofocus algorithm is to reach the peak of the autofocus curve while requiring a minimum number of camera focus positions. However, the existing mechanisms may never converge on a proper focus and they are often slow or may continue "hunting" for the proper focal position.

One critical metric for capturing a desired image is that it be properly focused. Numerous systems have been developed for estimating or attaining a proper camera focus. As a camera-lens system has a number of related elements and characteristics, a brief discussion follows of these elements and their associated characteristics.

Generally, the two main optical parameters of a photographic lens are maximum aperture and focal length. The focal length determines the angle of view, and the size of the image relative to that of the object (subject) for a given distance to the subject (subject-distance). The maximum aperture (f-number, or f-stop) limits the brightness of the image and the fastest shutter speed usable for a given setting (focal length/effective aperture), with a smaller number indicating that more light is provided to the focal plane which typically can be thought of as the face of the image sensor in a simple digital camera.

One form of typical simple lens, which is technically a lens having a single element, has a single focal length and is also referred to as a "prime lens". In focusing a camera using a single focal length lens, the distance between lens and the focal plane is changed which results in altering the focal point where the photographic subject image is directed onto the focal plane. Thus, although the single focal length lens has a fixed optical relation and focal length, it is used in the camera to focus on subjects across a focal range span. Consequently, one should not confuse the fixed focal distance of a lens with the range of focal distance obtainable on a camera using that lens, whereby adjusting the position of that lens in relation to the focal plane alters focal distance.

In using a single focal length lens one would adjust aperture to select the amount of light with respect to desired shutter speed, and then adjust focus according to the subject-distance, which is also referred to as the focal distance and then capture an image. Often a macro setting is provided with a different focal length selection, on an otherwise single focal length lens, for taking close-up shots. A telephoto lens provides a very narrow angle of view with high magnification for filling the frame with images from distance objects.

Multi-focal length lenses are usually referred to as "zoom" lenses, because image magnification can be "zoomed", or "unzoomed" as the case may be. Zoom lenses allow the user to select the amount of magnification of the subject, or put another way, the degree to which the subject fills the frame. It is important to understand that the zoom function of these lenses, or camera-lens systems, is conceptually separate from both the focus control and the aperture control.

Regardless of whether a single-focal length lens or multi-focal length lens is utilized, it is necessary to properly focus the lens for a given subject-distance. An acceptable range of focus for a given focus setting is referred to as "depth of field" which is a measurement of depth of acceptable sharpness in the object space, or subject space. For example, with a subject distance of fifteen feet, an acceptable range of focus for a high definition camera may be on the order of inches, while optimum focus can require even more precision. It will be appreciated that depth of field increases as the focusing moves from intermediate distances out toward "infinity" (e.g., capturing images of distant mountains, clouds and so forth), which of course at that range has unlimited depth of field.

For a single focal length lens at a given aperture setting there will be a single optimum focus setting for a given distance from camera to the subject (subject-distance). Portions of the subject which are closer or farther than the focal distance of the camera will show up in the captured images subject to some measure of blurring, as depends on many factors that impact depth of field. However, in a multi-focal lens there is an optimum focus point for each lens magnification (lens focal length) obtainable by the lens. To increase practicality, lens makers have significantly reduced the need to refocus in response to zoom settings, however, the necessity for refocusing depends on the specific camera-lens system in use. In addition, the aperture setting can require changing in response to different levels of zoom magnification.

Originally, camera focus could only be determined and corrected in response to operator recognition and manual focus adjustments. However, due to the critical nature of focus on results, focusing aids were readily adopted. More recently, imaging devices often provide the ability to automatically focus on the subject, a function which is generically referred to today as "auto focus". Focus continues to be a point of intense technical development as each of the many existing auto focus mechanisms are subject to shortcomings and tradeoffs.

Two general types of auto focus (AF) systems exist, active auto focus and passive auto focus. In active auto focus, one or more image sensors is utilized to determine distance to the focal point, or otherwise detect focus external of the image capture lens system. Active AF systems can perform rapid focusing although they will not typically focus through windows, or in other specific applications, since sound waves and infrared light are reflected by the glass and other surfaces. In passive auto focus systems the characteristics of the viewed image are used to detect and set focus.

The majority of high-end SLR cameras currently use through-the-lens optical AF sensors, which for example, may also be utilized as light meters. The focusing ability of these modern AF systems can often be of higher precision than that achieved manually through an ordinary viewfinder.

One form of passive AF utilizes phase detection, such as by dividing the incoming light through a beam splitter into pairs of images and comparing them on an AF sensor. Two optical prisms capture the light rays coming from the opposite sides of the lens and divert it to the AF sensor, creating a simple rangefinder with a base identical to the diameter of the lens. Focus is determined in response to checking for similar light intensity patterns and phase difference calculated to determine if the object is considered in front of the focus or in back of the proper focus position.

In another type of passive AF system, contrast measurements are made within a sensor field through the lens. The system adjusts focus to maximize intensity difference between adjacent pixels which is generally indicative of correct image focus. Thus, focusing is performed until a maximum level of contrast is obtained. This form of focusing is slower than active AF, in particular when operating under dim light, but is a common method utilized in low end imaging devices.

Passive systems are notoriously poor at making focal decisions in low contrast conditions, notably on large single-colored surfaces (solid surface, sky, and so forth) or in low-light conditions. Passive systems are dependent on a certain degree of illumination to the subject (whether natural or otherwise), while active systems may focus correctly even in total darkness when necessary.

Accordingly a need exists for a system and method of controlling camera focusing in a more deterministic manner. These needs and others are met within the present invention, which overcomes the deficiencies of previously developed autofocus systems and methods.

BRIEF SUMMARY OF THE INVENTION

The present invention teaches a picture matching autofocusing method which is capable of obtaining proper focus more readily and accurately than existing mechanisms. One of the related autofocusing systems of the inventor is a related two-picture matching method which utilizes the most recent depth estimation result to determine the next lens position. This method works quite well when the matching curve is smooth. However, when the matching curve is noisy which happens frequently, the focus accuracy and speed performance are degraded. The present invention teaches a new autofocusing method which overcomes these shortcomings. Instead of providing focus based on the relationship of the two pictures, the present invention utilizes a novel means of combining both present and previous (e.g., all depth estimates for this picture) depth estimation results during the autofocus process to determine the next lens position based on statistical models and confidence measure. The present invention substantially improves focus accuracy and speed, even when the matching curve is noisy. This invention extends usability of autofocus methods in real world conditions by (1) using present and previous (e.g., all previous predictions for this picture) predicted lens positions instead of just the most recent one to improve accuracy of prediction, and (2) generating a confidence measure of predicted lens position during autofocus.

The invention is amenable to being embodied in a number of ways, including but not limited to the following descriptions.

One embodiment of the invention is an apparatus for controlling automatic focus, comprising: (a) a computer processor configured for controlling an imaging device and associated focus control element; (b) memory coupled to the computer processor; (c) programming on the memory which is executable by the computer processor for carrying out autofocusing steps comprising: (c)(i) capturing object images, (c)(ii) estimating depth between captured image pairs, (c)(iii) determining the weighted mean of depth and variance across both present and previous collected image pairs for this image, (c)(iv) adjusting focus in response to the weighted mean of the depth, and (c)(v) repeating the above steps until the variance reaches a value indicating that sufficient confidence in proper focus has been attained. The invention thus adjusts focus at each repetition of the programming steps in response to combining all the previous depth estimation results instead of only using the most recent depth estimation. In addition, at least one embodiment of the invention is preferably configured for responding to detecting an excessive number of lens focus movements and either terminating the focus process, assigning a large variance to the estimation result, resetting the number of repetitions and continuing autofocus, discarding the present depth estimate and taking another pair of pictures from which to calculate a new depth estimation, or performing another alternative toward obtaining a proper focus.

According to the present invention depth is estimated between captured image pairs, with each image of the pair taken at different focus distances, based on determining the amount of blur difference between the two pictures of the image pair to estimate the actual depth. In at least one embodiment of the invention, depth is estimated using maximum likelihood estimation (MLE) of subject depth. In at least one embodiment the depth is estimated using a weighted mean given by, $$\bar{d} = \frac{\sum_{i=1}^{N}\left(\frac{d_i}{\sigma_i^2}\right)}{\sum_{i=1}^{N}\left(\frac{1}{\sigma_i^2}\right)}$$

in which N represents the number of lens movements during the autofocus process and N unbiased depth estimation results $d_1, \ldots, d_N$ have been obtained with $d_i \sim N(\mu, \sigma_i^2)$, wherein $\mu$ is the actual subject depth, $d_i$ is distance, and $\sigma_i^2$ is the variance, the Maximum Likelihood Estimation (MLE) of $\mu$ is given by the weighted mean. The variance is determined with each focus iteration as a measure of confidence that the predicted lens position provides optimum focus. In at least one embodiment the variance of the weighted mean is given by, $$\sigma_d^2 = \frac{1}{\sum_{i=1}^{N}\left(\frac{1}{\sigma_i^2}\right)}$$

in which N represents the number of unbiased depth estimation results during the autofocus process.

Embodiments of the invention, such as including a computer processor, imaging device and focus control, may be incorporated within still image cameras, or less preferably operate aspects of video cameras or combination still and video image cameras.

One embodiment of the invention is an apparatus for electronically capturing images, comprising: (a) an imaging device; (b) a focus control element coupled to the imaging device; (c) a computer processor coupled to the imaging device and the focus control element; (d) memory coupled to the computer processor; (e) programming executable on the computer processor for carrying out autofocusing steps comprising, (e)(i) capturing object images, (e)(ii) estimating depth between captured image pairs, (e)(iii) determining the weighted mean of depth and variance across past and present collected image pairs, (e)(iv) adjusting focus in response to the weighted mean of the depth, and (e)(v) repeating the above steps until the variance reaches a value indicating that sufficient confidence in proper focus has been attained. The estimation of depth between captured image pairs is preferably performed in response to a focus matching model (of any desired form) based on blur differences determined in response to contrast changes detected as the subject distance changes through at least a portion of the focal range of the camera.

One embodiment of the invention is a method of automatically adjusting camera focus, comprising: (a) capturing a first object image by a camera device; (b) capturing an additional object image by the camera device; (c) estimating depth between captured image pairs in response to inputting the blur difference between the captured images into a focus matching model and solving the model to generate an estimation of distance to the object; (d) determining the weighted mean of depth and variance across past and present collected image pairs; (e) adjusting camera focus position in an autofocusing process in response to the weighted mean of the depth; and (f) repeating steps (b) through (e) until the variance reaches a value indicative of sufficient confidence in achieving a proper focus (e.g., below a variance threshold). In at least one embodiment when it is determined that the number of repetitions of steps (b) through (e) have exceeded a desired threshold, then the autofocus process is altered by performing (e)(i) terminating autofocus at the present focus position, or (e)(ii) assigning a large variance to the estimation result and continuing the autofocus process, or (e)(iii) discarding present depth estimates and taking one or more additional pairs of pictures from which to calculate a new depth estimation.

The present invention provides a number of beneficial aspects which can be implemented either separately or in any desired combination without departing from the present teachings.

An aspect of the invention is automatic image focusing (AF) during image acquisition.

Another aspect of the invention is to increase the accuracy of automatic focus (AF) mechanisms.

Another aspect of the invention is to reduce the amount of lens motion needed during automatic focusing (AF).

Another aspect of the invention is to increase determinism for AF mechanisms, so that a proper focus is attained at a high level of confidence.

Another aspect of the invention is to perform autofocusing based on weighted sums of previous distance estimations based on blur differences, instead of using the most recent estimation.

Another aspect of the invention is to generate a confidence measure, at each step of the autofocusing process, which can be utilized for controlling the extent of focusing iterations and whether other actions need be taken to assure proper focus.

Another aspect of the invention is an autofocus method which can be implemented in any imaging device configured with an imaging device and computer processor adapted for processing captured images.

A still further aspect of the invention is an autofocus method which can be implemented in any type of still camera.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 1 is a schematic of capturing multiple images at multiple focal points according to an aspect of the present invention.

FIG. 2A-2B are schematics of calibration target (e.g., step edge) images according to an aspect of the present invention.

DETAILED DESCRIPTION OF THE INVENTION

Figure 3:
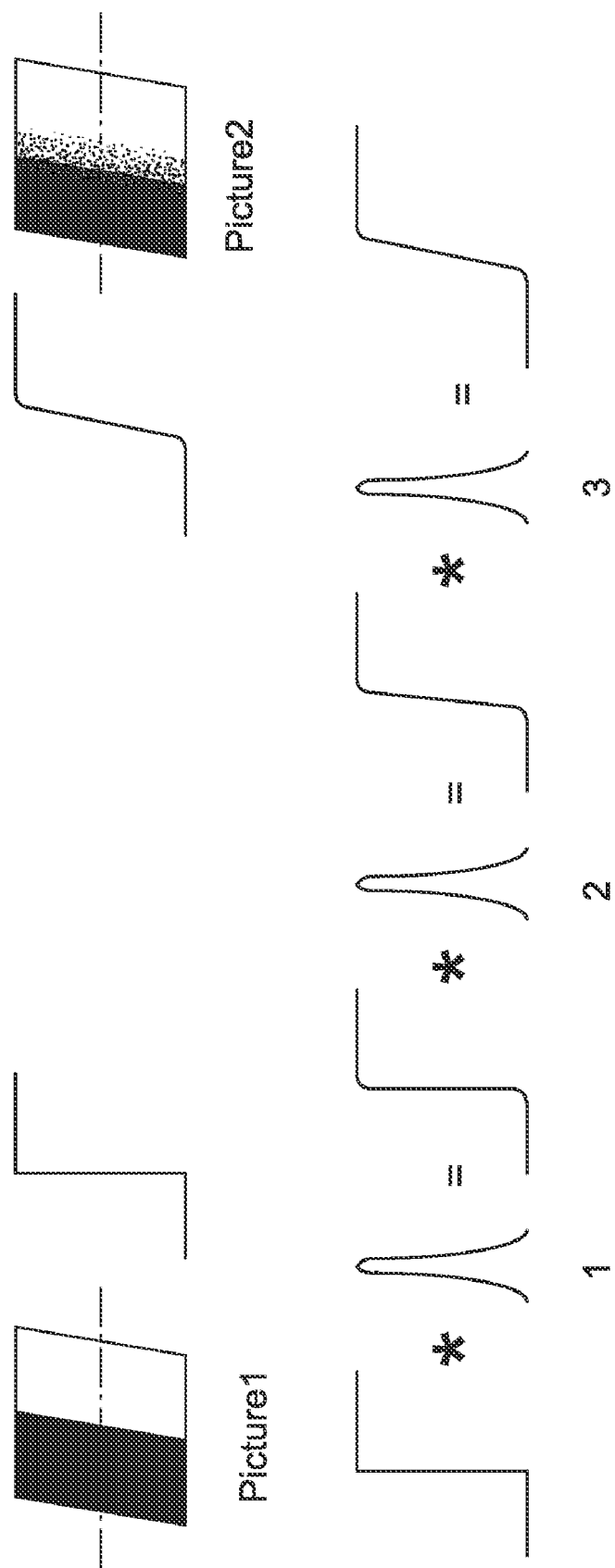
FIG. 3 is a schematic of computing blur difference in three iterations according to an aspect of the present invention.

Referring more specifically to the drawings, for illustrative purposes the present invention is embodied in the apparatus generally shown in FIG. 1 through FIG. 15. It will be appreciated that the apparatus may vary as to configuration and as to details of the parts, and that the method may vary as to the specific steps and sequence, without departing from the basic concepts as disclosed herein.

Autofocusing utilizing the existing two-picture matching uses the most recent depth estimation result for autofocus, but is unable to properly handle noisy matching curves. The objective is to develop a method which improves focusing accuracy and reduces the number of lens movements under noisy situations. This objective can be achieved by combining past and present (e.g., all estimates generated for this picture) depth estimation results during the autofocus process.

1. Blur Difference.

When the subject is in focus, the captured image is the sharpest (has the highest contrast). It becomes blurrier (less contrast) as the lens moves away from the in-focus position. Generally, when two pictures are taken at two different focus distances, the one taken closer to the subject distance is sharper than the other. The focus distances at which the pictures are taken and the amount of the blur difference between these two pictures can be used to estimate the actual subject distance, or depth.

FIG. 1 illustrates an embodiment 10 in which multiple images are captured of a calibration target (or subject), at different focal positions (subject-distances) when characterizing a given imaging apparatus (e.g., specific make or model of camera). An imaging device (camera) 12 is shown which can focus from a minimum focal length 14 on out to infinity 16. Minimum focal distance 14 (e.g., in this case 35 cm) is shown as well as focus at infinity 16. According to the invention, the focus converges to first focal position 18 and then to a second focal position 20, upon a calibration target 22, such as step-edge image, slate, graticule, or similar target having known optical characteristics, along focal path 24. By way of example, the focusing distance of the camera ranges between the minimal focus distance (e.g., 35 cm) to infinity.

FIG. 2A depicts a condition 30 in which subject 32 is in focus, wherein the captured image is the sharpest, as represented by the sharp contrast curve 34, which is also referred to as the "edge profile" of the step edge. It will be appreciated that the calibration target, or subject, preferably provides a mechanism for simply determining the sharpness of focus based on contrast. For example in a step-edge target, a clear step-edge delineation is made between at least two colors, shades, luminances, wherein the sharpness of focus can be readily determined from the sharpness of the contrast profile. It will be appreciated by one of ordinary skill in the art that the target can be configured in any of a number of different ways, in a manner similar to the use of different chroma keys and color bar patterns in testing different aspects of video capture and output.

FIG. 2B depicts the condition 36 as the image of object 38 becomes increasingly blurry as the lens moves away from the 'in-focus' position, with a resulting sloped contrast curve 40 shown. Generally, when two pictures are taken at two different focal distances, the one taken closer to the subject-distance is sharper than the other. The focal distances at which the pictures are taken and the amount of the blur difference between these two pictures can be used to estimate the actual subject distance, or depth.

Consider the case where two pictures $f_A$ and $f_B$ are taken at positions A and B, with $f_A$ being sharper than $f_B$. The blur change can be modeled by a point spread function P from position A to B.

$$f_A * P = f_B$$

where * denotes the operation of two dimensional convolution. Furthermore, the point spread function P can be approximated by using a series of convolutions by a blur kernel K.

$$P = K * K * \ldots * K \quad (1)$$

In the testing performing herein the kernel K was chosen as:

$$K = \frac{1}{64}\begin{pmatrix} 1 & 6 & 1 \\ 6 & 36 & 6 \\ 1 & 6 & 1 \end{pmatrix} \quad (2)$$

Then the amount of blur difference between $f_A$ and $f_B$ can be measured by the number of convolutions in Eq. (1). In actual implementation, the blur difference is obtained by an iterative process.

$$I_{A\_B} = \underset{I}{\operatorname{argmin}} \| f_A \underbrace{* K * K * \ldots * K}_{I \text{ convolutions}} - f_B \| \quad (3)$$

where $\|.\|$ denotes a norm operator that evaluates the blur matching error between $f_A$ and $f_B$.

2. Matching Curves.

A matching curve is a relationship between the iteration number and the lens focus position. In order to obtain the matching curve for a given depth, a sequence of pictures is taken for the whole focus range of the lens, after which the blur difference is calculated between every two pictures. The first picture of the sequence is taken at the focus distance of infinity, then one picture is taken every time the lens is moved to focus at one depth of field closer, until the lens reaches minimal focus distance. This sequence of pictures is denoted by $f_0, f_1, \ldots, f_{N-1}$, where N is the length of the sequence.

Figure 4:
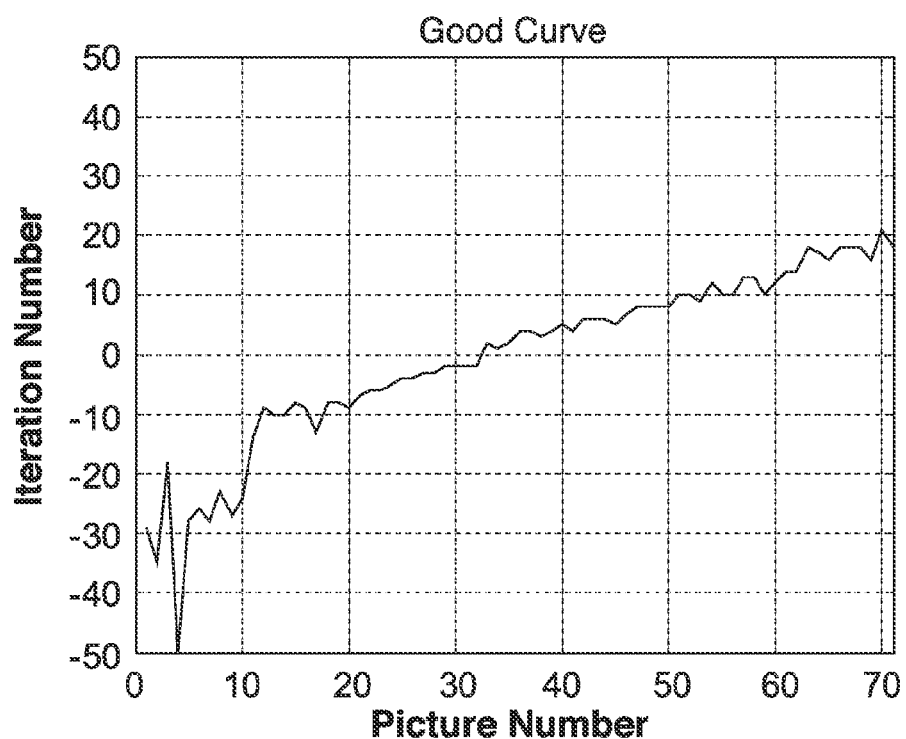
FIG. 4 is a graph of a good matching curve which was collected and that shows iteration numbers with respect to picture number during focusing.
Figure 5:
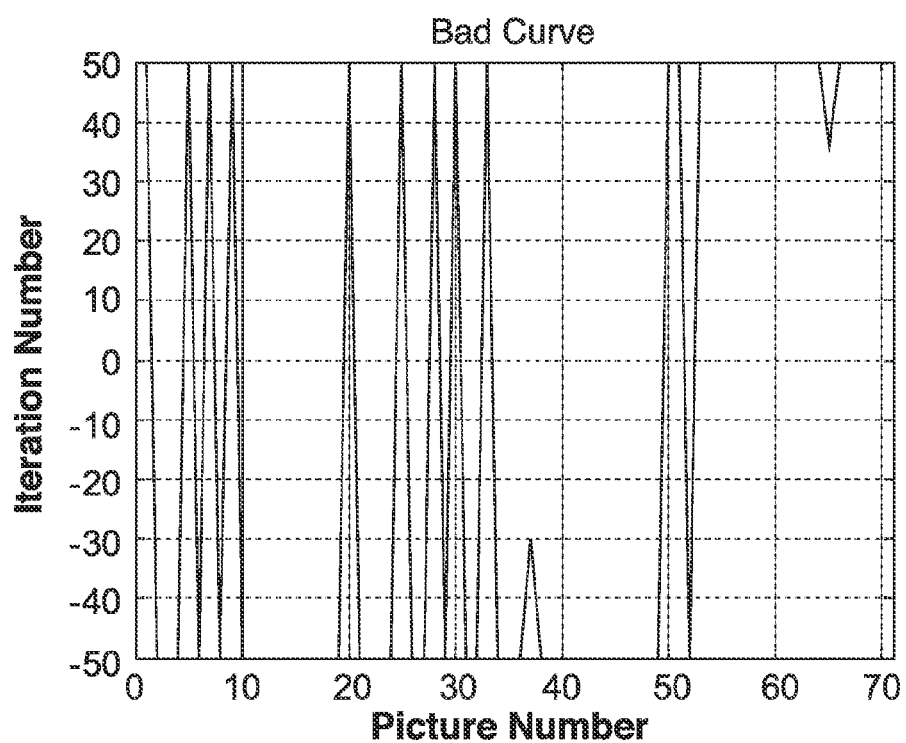
FIG. 5 is a graph of a bad matching curve which was collected and that shows iteration numbers with respect to picture number during focusing.

FIG. 4 and FIG. 5 illustrate different matching curves depicting noisy data that fit some statistical model (FIG. 4), and outliers that don't fit any statistical model (FIG. 5).

FIG. 4 depicts a graph of example test results showing a matching curve as the relationship between iteration number and focus positions across a focal range. By way of example and not limitation, the sequence was taken by a Sony DSC-T200 camera at focal length 175 mm (35 mm equivalent) and aperture f4.4, with the subject being a step edge image. By way of example, the resolution of the captured image was reduced, in this example to 320×240 pixels. For this example, the blur difference of $f_i$ and $f_{i+4}$ was calculated for i=0, ..., N−5. It should be appreciated that the sign of the blur difference values merely provide a convenient means for denoting which image is sharper. If the sign is positive, $f_i$ is sharper than $f_{i+4}$ otherwise, if the sign is negative then $f_{i+4}$ is the sharper image.

The "picture number" axis of FIG. 4 indicates the image pairs for which the iteration number is calculated. In this example, picture number i means that the iteration number is calculated between $f_{i-2}$ and $f_{i+2}$. It can be seen that the absolute value of the number of iterations increases when the lens focus position moves away from the subject distance. The zero-crossing point (shown crossing around picture number 33 in FIG. 4) is where the subject is in focus.

FIG. 5 depicts a graph of example test results showing a "bad" relationship between iteration number and focus positions, such as may result in response to computing outliers. These results are referred to as "bad" because they do not properly model proper system response. It is not surprising that typical autofocus mechanisms when encountering "bad" data such as this, are unable to achieve proper focus.

3. Depth Estimation and Autofocus.

Depth estimation is performed in response to matching curve characteristics. It will be appreciated that the characteristics can be modeled by linear slopes or polynomials. During the autofocus process, pictures are taken at different focus positions. The blur difference between each two pictures is calculated, and the matching curve model utilized to estimate the depth.

For autofocus applications, the lens is traditionally moved to focus at the estimated distance, then the new depth is estimated in the same manner. The procedure is then repeated until the iteration number converges to 0 (in-focus), or alternatively below some specified threshold. The best result of these estimated distances is considered to be the most recent depth estimation. This "most-recent-estimation" approach, however, suffers from several drawbacks: (1) convergence is not guaranteed; (2) there is no assurance that the next depth estimation will provide more accuracy; (3) it is a slow process, especially when the matching curve is noisy; and (4) the method doesn't properly handle situations in which the blur difference result is faulty (e.g., an outlier).

The method according to the present invention overcomes these shortcomings to reach an accurate focus very readily.

4. Combining Multiple Depth Estimation Results.

The depth estimation error is designed as follows.

$$e = d - f \quad (4)$$

where d is estimated subject depth, and f is the actual subject depth. The error e is modeled using a Gaussian distribution $e \sim N(\mu, \sigma^2)$, in which the mean value $\mu$ represents the amount of estimation bias, while variance $\sigma^2$ is a measure of confidence level. The smaller the value of $\sigma^2$, the more confidence is provided by the estimation result.

When the lens position is moving farther from the actual focus position, then absolute value of iteration number is larger and the confidence level of the depth estimation result is generally lower.

Figure 6:
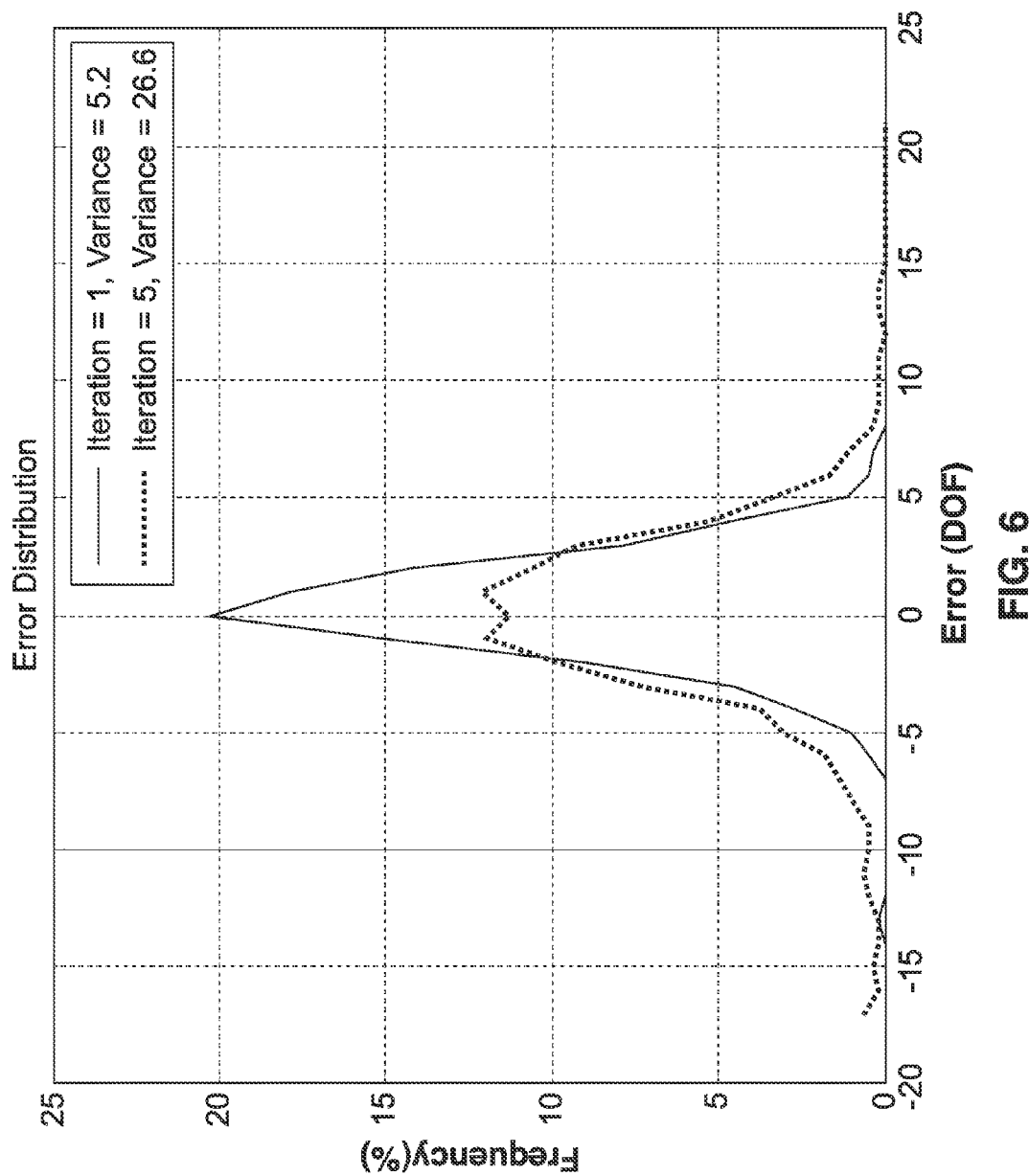
FIG. 6 is a graph of error distributions with respect to iterations and variance, showing how variance increases with the number of iterations.

FIG. 6 illustrates how variance increases as the iteration number increases, with curves showing a single iteration (solid line) with a variance of 5.2, and five iterations (dashed line) with a variance of 26.6. It will be observed that the iteration numbers increase as the lens position moves farther from the focus position. In addition, as the iteration number increases, the curve becomes noisier and the estimation becomes less reliable.

Figure 7:
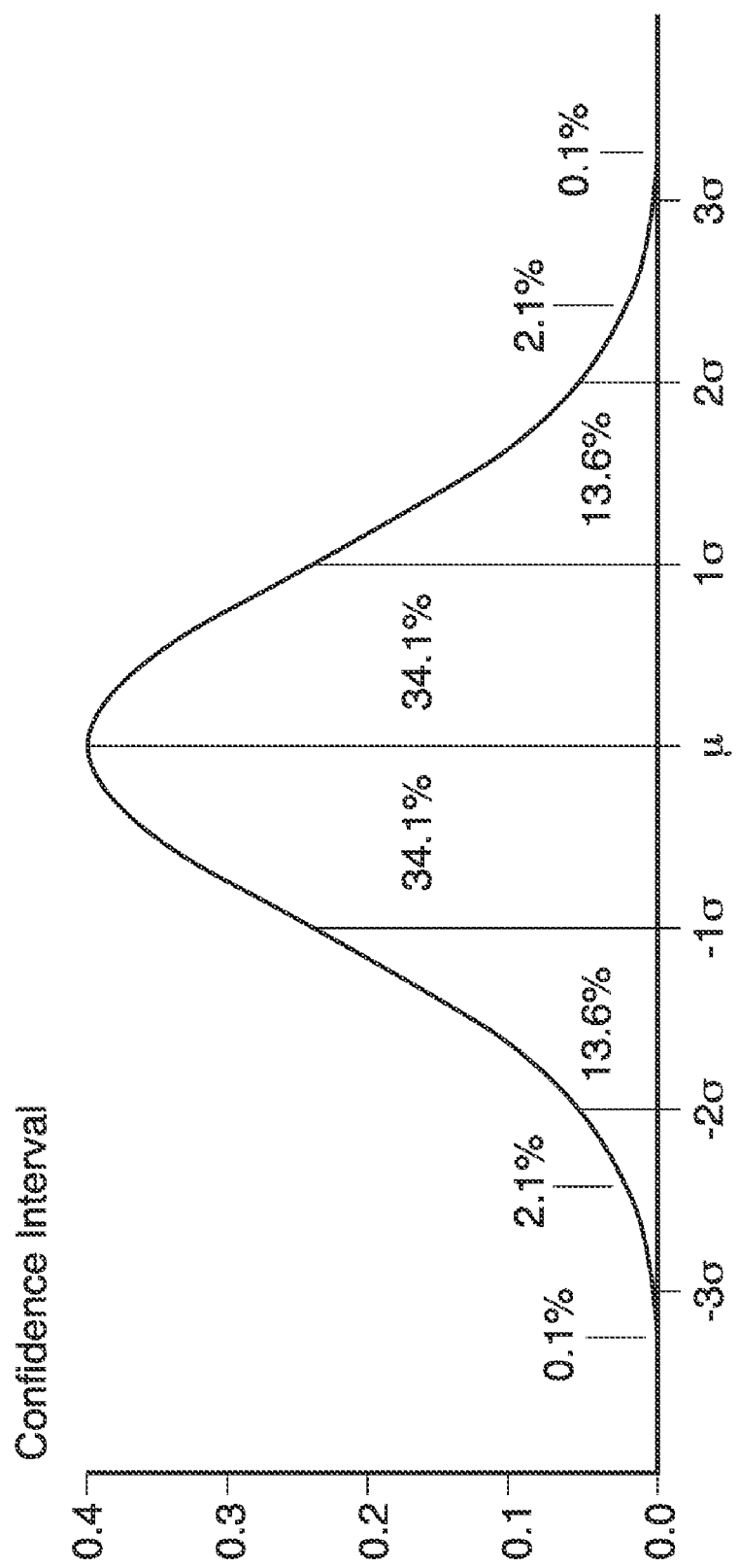
FIG. 7 is a graph of a Gaussian distribution showing focus confidence over three standard deviations.

FIG. 7 illustrates a confidence interval within a Gaussian distribution. In the distribution shown, the mean value $\mu$ is the amount of bias, while variance $\sigma^2$ measures the reliability of the estimation result, or confidence level. It will be appreciated that for a Gaussian distribution, about 68% of the values are within one standard deviation from the mean; about 95% are within two standard deviations and about 99.7% are within three standard deviations.

For example, when the iteration number is 0, the focus position is estimated to be the current lens position. The estimation variance is 2.60 based on the statistical data (DSC-T200 telephoto wide open). The standard deviation is 1.61. There exists a 68% confidence that the estimation is within 1.61 DOF; 95% confidence within 3.22 DOF and 99.7% confidence within 4.83 DOF.

Figure 8:
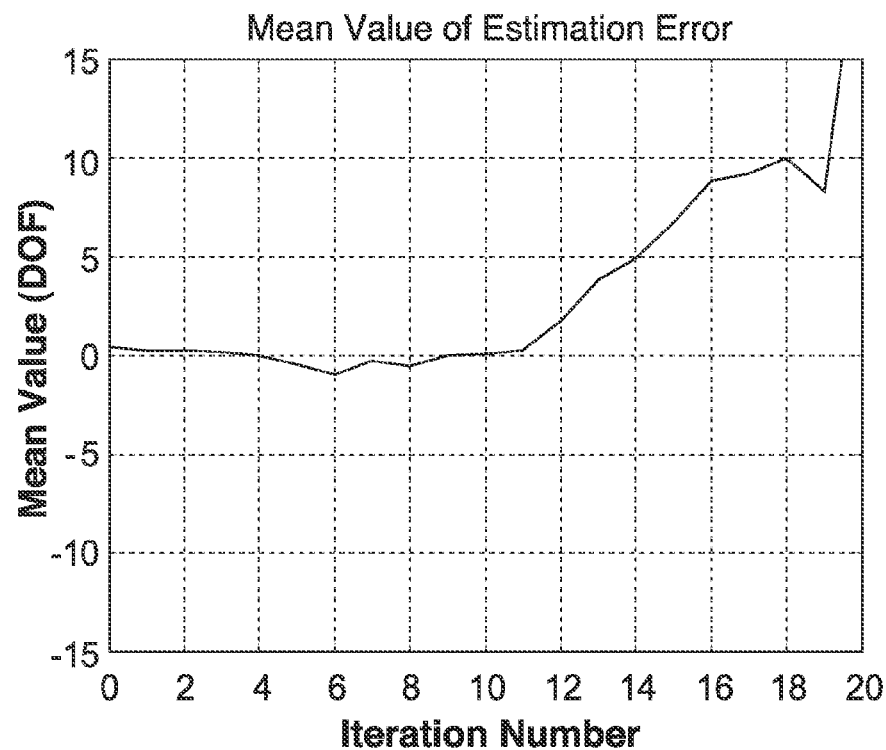
FIG. 8 is a graph of mean values of estimation error versus iteration number, showing focal confidence.

FIG. 8 illustrates mean values of estimation error versus iteration number. The graph shows that the mean value increases sharply as the iteration number increased beyond 11. Ideally, the estimation would be unbiased with a mean value of 0 for all iteration numbers. Yet, the estimation becomes biased in response to the presence of noise, outliers, modeling error, and other error sources. Making the estimation unbiased requires subtracting the mean value from the estimation result. The mean value is nearly 0 when the iteration number is less than 11.

Figure 9:
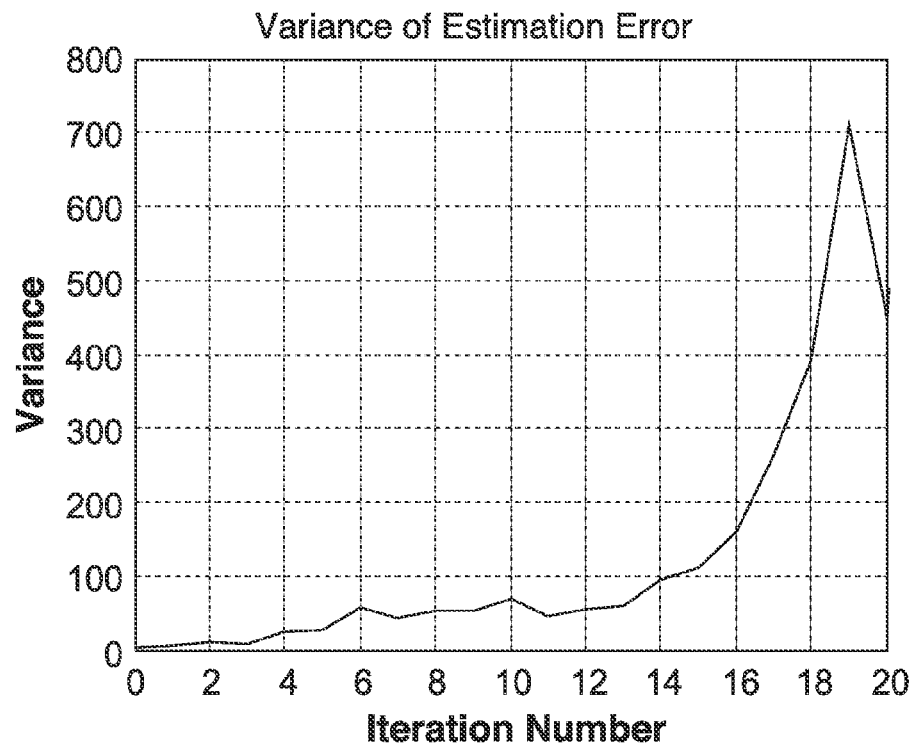
FIG. 9 is a graph of estimation error and shows variance increasing as the iteration number increases.

FIG. 9 illustrates variance of estimation error and shows variance increasing as the iteration number increases. It will be noted that the variance climbs rapidly beyond 13-14 iterations, as seen in this example result.

The present invention is configured to combine estimation results when more than one lens movement is required for autofocusing, and thus to use both past and present estimates generated during focusing, instead of only the most recent estimate which is based on only two pictures. The purpose for this can be understood as follows.

Suppose N pairs of images have already been captured during autofocus process and N unbiased depth estimation results $d_1, \ldots, d_N$ have been obtained with $d_i \sim N(\mu, \sigma^2)$. The mean value $\mu$ is the actual subject depth. Assuming $d_i$, as depth estimations from the ith image pair, are independent, given $\sigma_i^2$, the Maximum Likelihood Estimation (MLE) of $\mu$ is given by the weighted mean.

$$\bar{d} = \frac{\sum_{i=1}^{N} \left( \frac{d_i}{\sigma_i^2} \right)}{\sum_{i=1}^{N} \left( \frac{1}{\sigma_i^2} \right)} \quad (5)$$

$$\sigma_{\bar{d}}^2 = \frac{1}{\sum_{i=1}^{N} \left( \frac{1}{\sigma_i^2} \right)} \quad (6)$$

This variance $\sigma_{\bar{d}}^2$ is smaller than any individual variance $\sigma_i^2$ for $d_i$, which means that the weighted mean $\bar{d}$ gives more confidence than any individual $d_i$ does. Therefore $\bar{d}$ should be used for autofocus instead of relying on the most recent estimation. The convergence condition for this autofocus process arises in response to sufficient confidence in $\bar{d}$, or when $\sigma_{\bar{d}}^2$ is below a specified threshold. Each new estimation reduces the variance of the weighted mean. High accuracy focusing results can be obtained if enough lens movements and pictures are taken.

It should be appreciated when using the most-recent-estimation approach, that iterative lens movement needs to be stopped when it returns to a prior location, so as to prevent an infinite loop, wherein convergence to a focus position is never attained. By contrast, in the weighted mean approach of the present invention, lens motion need not be stopped as each new estimation leads to an increasing confidence level and improved focus.

For the most-recent-estimation method, the convergence condition arises when the iteration number is 0, or nearly 0, yet it does not function properly in response to noisy matching curves. However, using the weighted mean approach of the present invention, autofocusing converges in response to attaining sufficient confidence in the result, or when the estimation variance is below a certain threshold.

In one test of the invention, test results were generated in response to 257 natural scene sequences taken using a Sony DSC-T200 camera. The sequences spanned different lighting conditions, indoor and outdoors, fine and coarse textures, and so forth. Of these sequences, 37 had too many outliers to build statistical models, and were handled separately. Of the remaining sequences, 219 were found to be "better but still noisy" sequences, of these 109 sequences were randomly selected for training (calculating mean and variance), while the remaining 110 sequences were used for testing. In these tests the threshold estimation variance was set to 4.0, which yielded 95% confidence within 4 depths-of-field (DOF).

Figure 10:
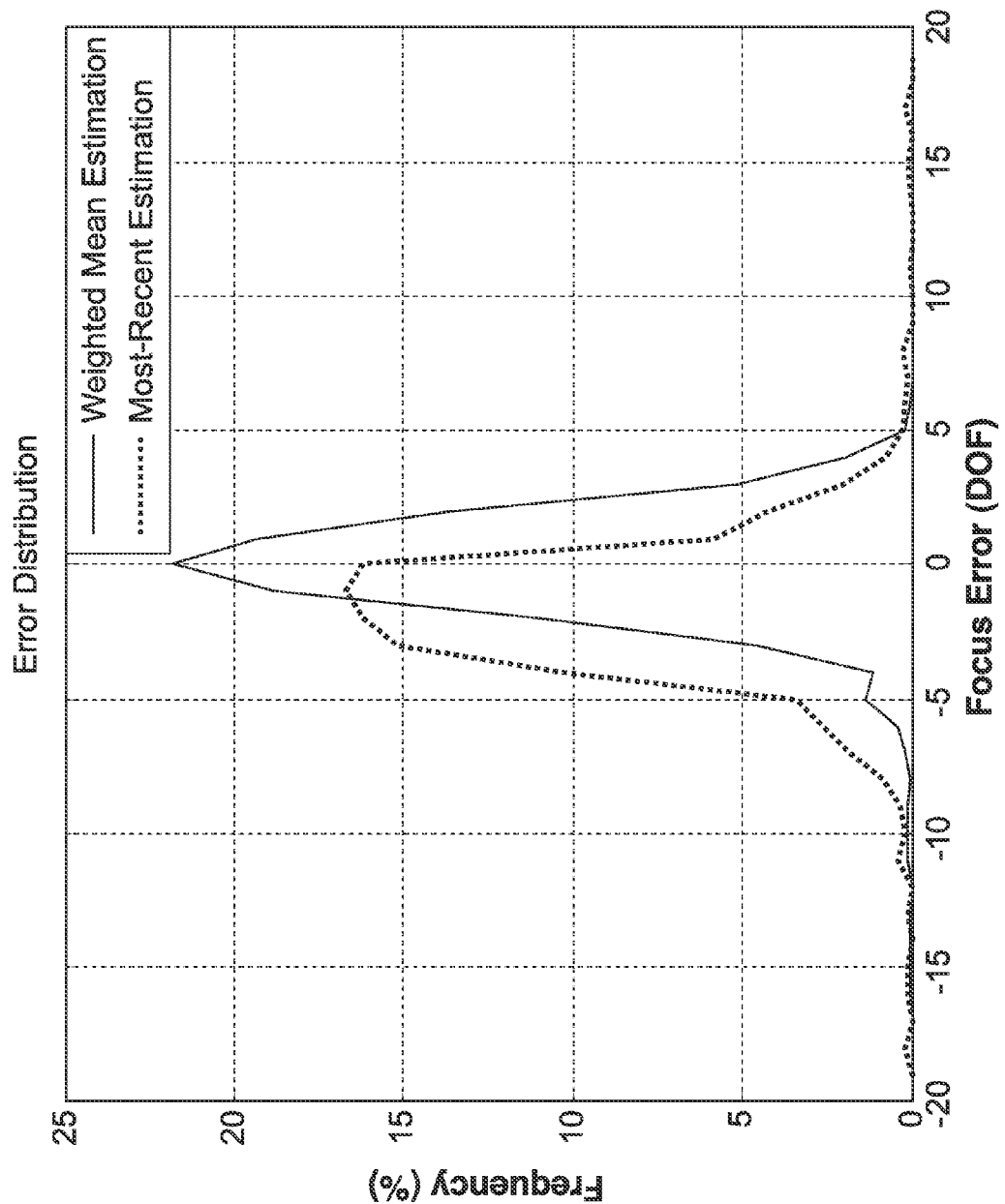
FIG. 10 is a graph of focus error test results comparing a most-recent estimation process with the weighted-mean estimation according to an embodiment of the present invention.

FIG. 10 depicts test results comparing weighted-mean estimation (solid line) according to the present invention, with most-recent estimation (dashed line). It can be seen from these results that focusing errors were reduced using the inventive method with far fewer focusing errors. Looking more carefully it is seen that for the weighted mean method 97.5% of AF results were obtained within 4 DOF. However, the most-recent-estimation method (current implementation used in the field test), provided only 87.4% of AF results within 4 DOF. Correcting for estimation error of this method yields 90.6% of AF results within 4 DOF. A substantial improvement in performance is evident using the inventive weighted-mean estimation method.

Figure 11:
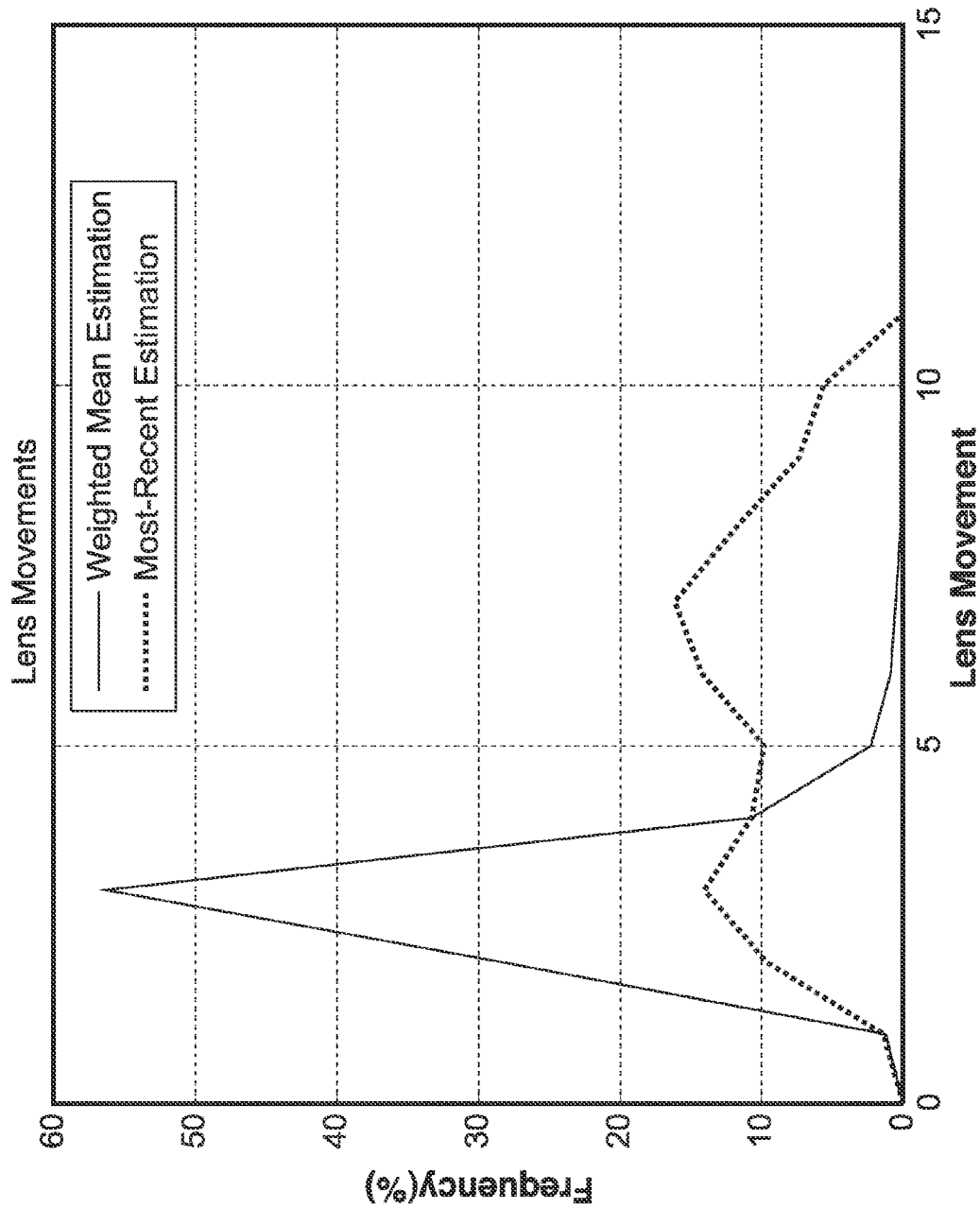
FIG. 11 is a graph of lens movement results which compares a most-recent estimation process with the weighted-mean estimation according to an embodiment of the present invention.

FIG. 11 illustrates a comparison between weighted-mean (solid line) and most-recent (dashed line) estimation methods. It will be appreciated, that aside from accuracy, another important metric regarding focusing involves the amount of lens motion required in attaining a focus position.

In response to weighted-mean estimations, the average number of lens movements was 2.92, with the average number of images captured as 2.92 pairs. However, using the most-recent-estimation method, the average number of lens movements was 5.66, with an average number of images captured as being 6.66 pairs. Therefore, the present invention requires far less lens movement and picture capturing (e.g., approximately one-half as much) as that required when using the most-recent estimation technique.

5. Depth Estimation with No Confidence.

If the depth estimation result is no better than using a random "guess", then the estimation provides no (zero) confidence. Technically, the confidence level is zero when the variance is infinity (uniform distribution).

Figure 12:
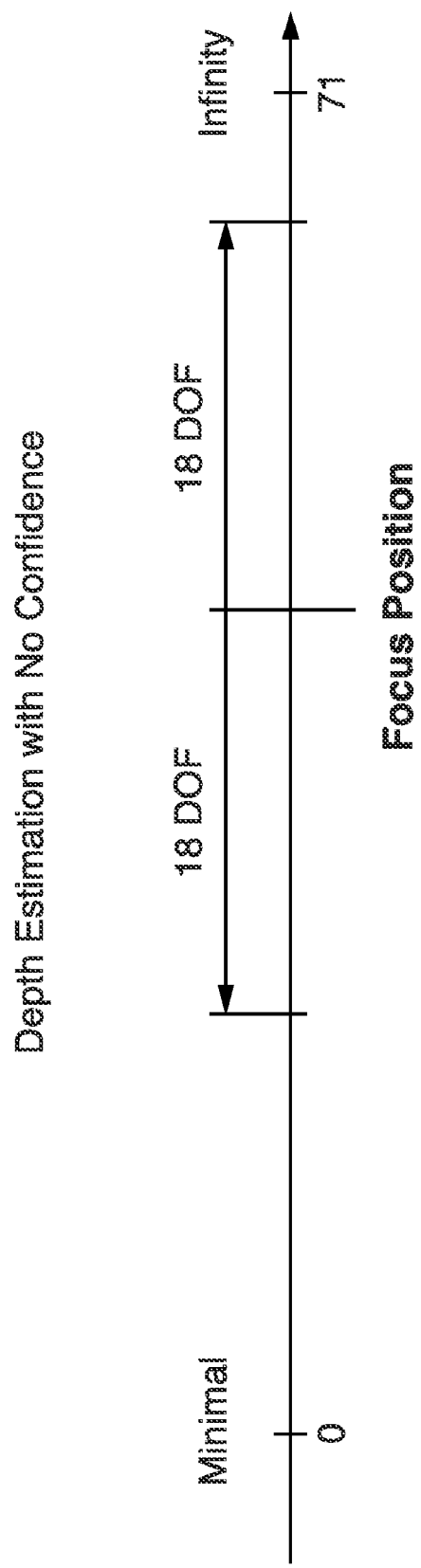
FIG. 12 is a line graph of focus position with respect to depth of field (DOF) with respect to depth estimation confidence levels.

FIG. 12 depicts 71 picture numbers (DOF) in the focusing range for Sony DSC-T200 camera with telephoto, selected by way of example and not limitation. If the probability is no more than 50% that the estimation result is within 18 DOF to the focus position (36 DOF interval, or half of the focusing range), then this is an estimation with no confidence.

Figure 13:
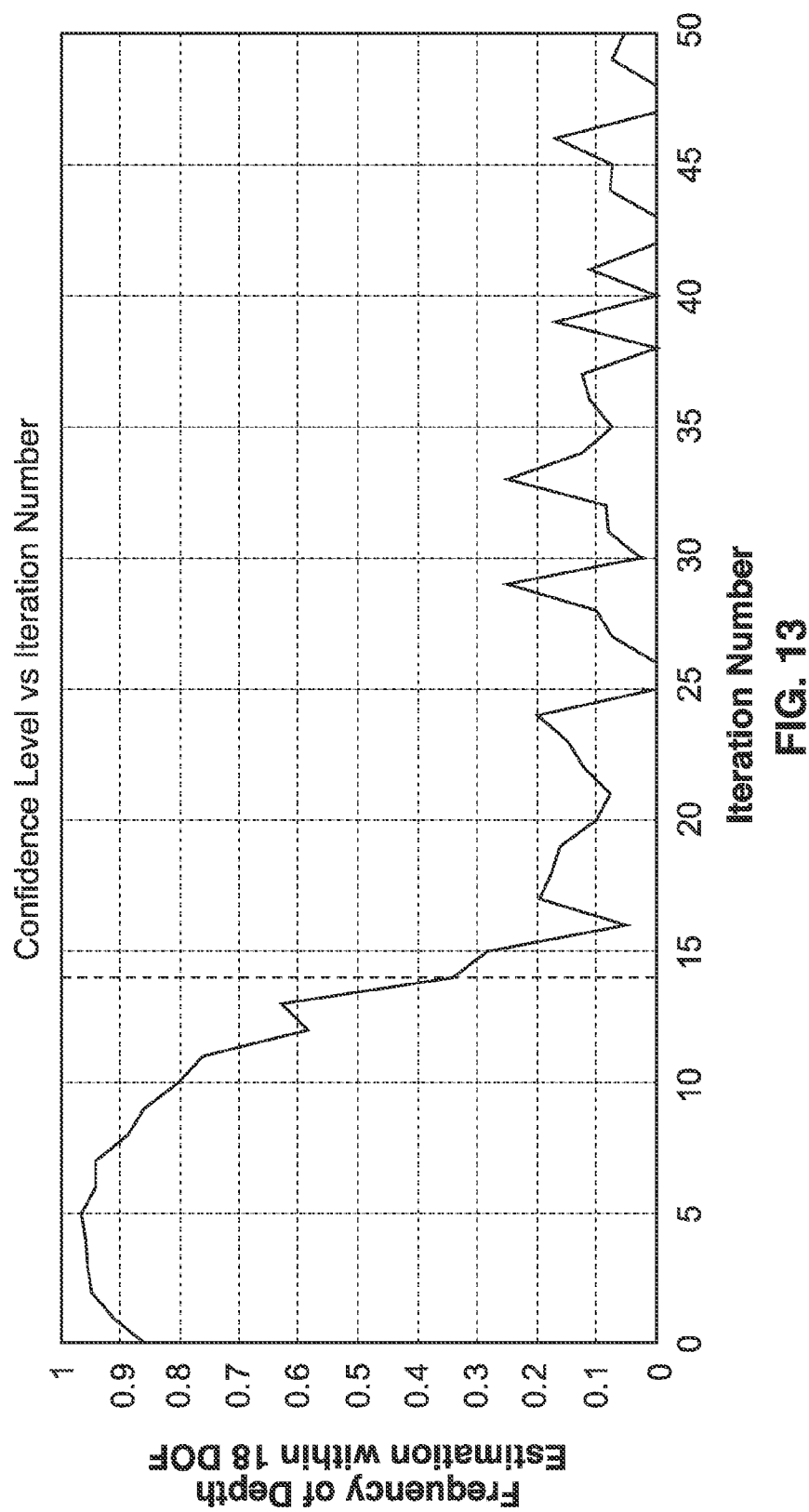
FIG. 13 is a graph of confidence level with respect to iteration number of weighted-mean estimation according to an embodiment of the present invention.

FIG. 13 depicts frequency of depth estimation as percentage of matching results within 18 DOF with respect to iteration number. The variance of the estimation is seen increasing as the iteration number increases. A threshold for the iteration number is therefore preferably established at a point at, or before, the point at which the results become no better than a random guesses. For this example, it can be seen that when the iteration number exceeds approximately 14, there is no confidence in the estimation results.

Unlike methods, such as most-recent estimation, the weighted-mean method of the present invention provides information about focal confidence, and thus it can recognize and take appropriate action when autofocusing may be providing an errant result, or is unlikely to converge at a proper focus. By way of example and not limitation, the following outlines three options that can be performed in response to a no-confidence-estimation.

1. Assign a large variance (e.g., 1000) to the estimation result and continue with the normal autofocus process. For example, FIG. 9 can be modified by assigning 1000 to every iteration number greater or equal to 14.

2. Discard this result, take another pair of pictures and calculate a new depth estimation.

3. Terminate the autofocus process.

In the testing performed on the present invention the first option was selected by way of example. It should be appreciated that the ability to generate focus confidence values can be utilized in a number of different ways without departing from the teachings of the present invention.

6. Summary of Autofocusing Method.

The present invention teaches the use of a weighted-mean of past and present estimation results for each iteration of lens movement, and provides improvement over estimations based on only the most-recent estimation. In addition, the present invention uses statistical variance to generate a confidence measure for controlling, modifying and/or terminating the autofocus (AF) process. The invention provides improved AF accuracy, and reduces both the number of lens movements and number of image captures required to reach proper focus.

Figure 14:
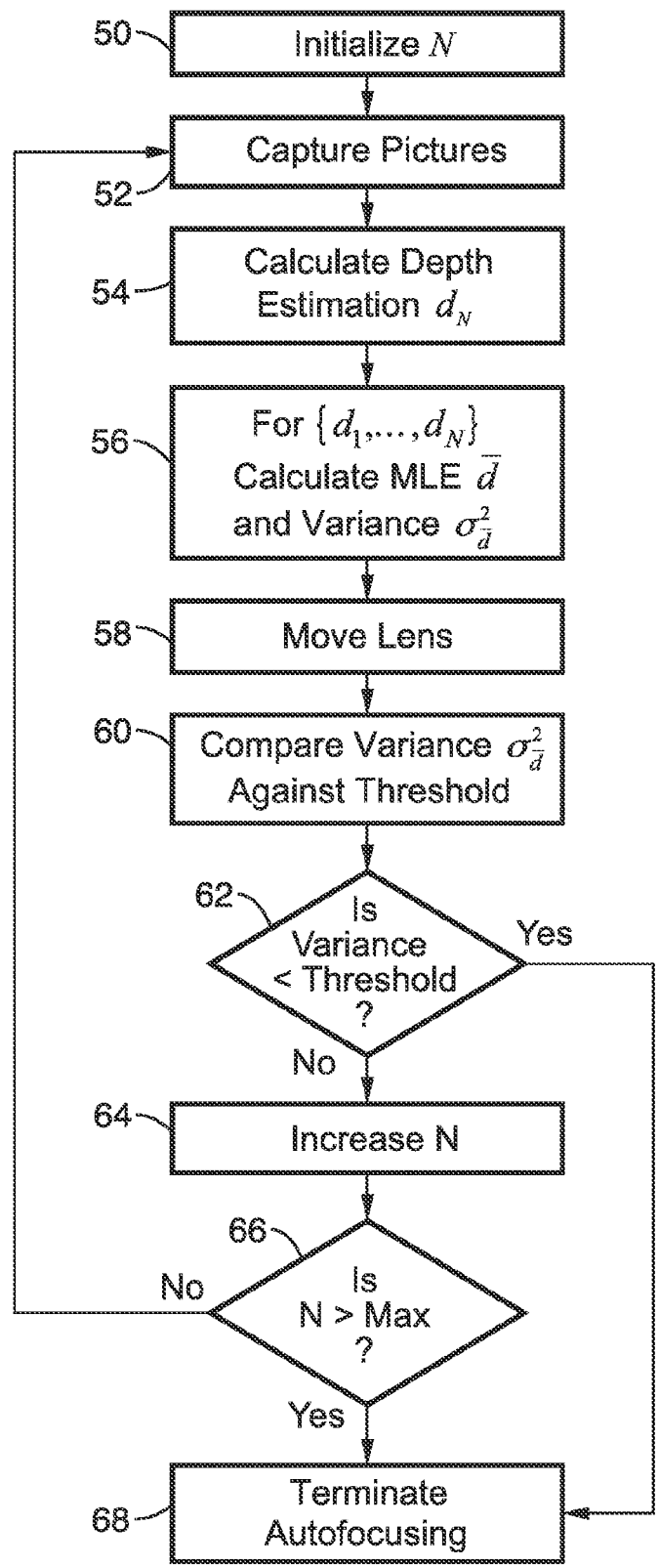
FIG. 14 is a flow diagram of performing weighted mean estimation with confidence measure according to an embodiment of the present invention.

FIG. 14 illustrates an example embodiment of the autofocusing method of the present invention. In step 50 the process is initialized, with N=1. Pictures are taken as per step 52 and depth estimation $d_N$ calculated as per step 54. For all $\{d_1, \ldots, d_N\}$ MLE $\bar{d}$ and its variance $\sigma_{\bar{d}}^2$ are calculated in step 56. The lens is moved as per block 58 to a depth indicated by MLE $\bar{d}$. A comparison is performed 60 between variance $\sigma_{\bar{d}}^2$ and a specified threshold. If the variance is below the threshold (or alternatively equal to or less than the threshold) as determined at step 62, then the autofocus process is terminated at step 68. Otherwise if $\sigma_{\bar{d}}^2$ is larger, then N is increased, such as by 1 (N=N+1) in step 64. A check on the size of N is performed as per step 66, and if N is bigger than the maximum allowed number of lens movements for autofocus, the autofocus process can be terminated 68, while otherwise processing can continue back at step 52. It should be appreciated that if variance is still excessive, even though the maximum value of N has been reached (detected in step 66) then options other than termination of autofocusing can be selected without departing from the teachings of the present invention.

7. Autofocusing Hardware Embodiment.

It should be appreciated that the present invention can be implemented on a variety of devices and systems which are configured to perform any of a number of different forms of image capture. By way of example and not limitation the following describes an embodiment within a camera device.

Figure 15:
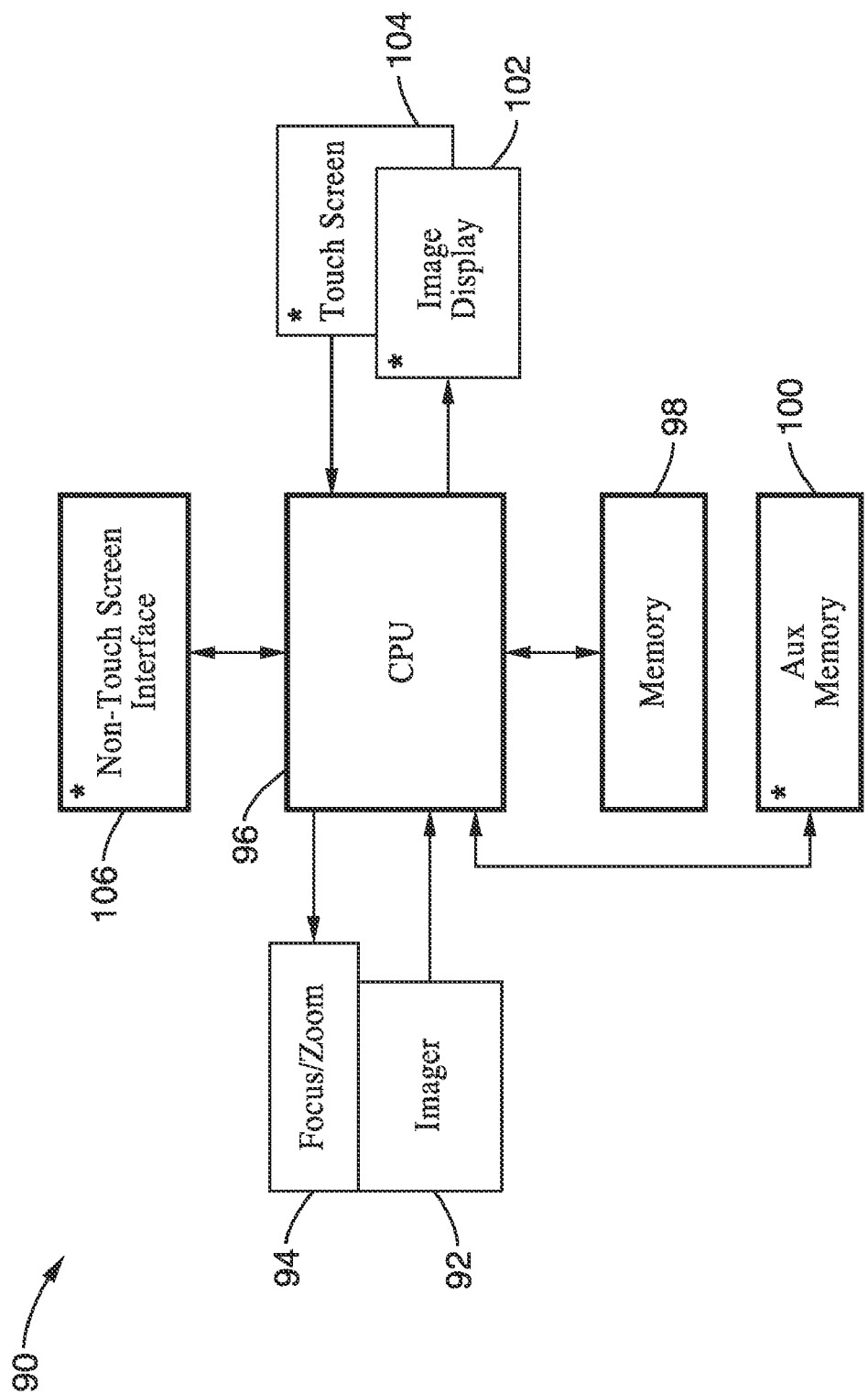
FIG. 15 is a block diagram of a camera which performs autofocusing the weighted mean estimation method with confident measure according to an embodiment of the present invention.

FIG. 15 illustrates an example embodiment 90 of an image capture device (camera) 90 configured for autofocusing according to the invention. A focus/zoom control 94 is shown coupled to imaging optics 92 as controlled by a computer processor (e.g., one or more CPUs, microcontrollers, and/or DSPs) 96. Computer processor 96 performs the autofocusing method in response to instructions executed from memory 98 and/or auxiliary memory 100. Shown by way of example for a still camera device are an optional image display 102 and touch screen 104, however, it will be appreciated that the method according to the present invention can be implemented on various image capture devices which are configured with imager, focus control, computer processor and memory. The presence of a zoom, touch-screen, image display, non-touch screen interface 116, and auxiliary memory are not necessary in the image capture device for practicing the present invention, but are shown as they exist on typical camera systems.

It should be appreciated that the autofocus steps generally shown in FIG. 14 are performed by computer processor 96 in combination with memory 98 and/or auxiliary memory 100.

The present invention provides methods and apparatus of camera focus control. Inventive teachings can be applied in a variety of camera apparatus and applications which require automatic focusing aspects, including still cameras, and so forth.

Embodiments of the present invention are described with reference to flowchart illustrations of methods and systems according to embodiments of the invention. These methods and systems can also be implemented as computer program products. In this regard, each block or step of a flowchart, and combinations of blocks (and/or steps) in a flowchart, can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts support combinations of means for performing the specified functions, combinations of steps for performing the specified functions, and computer program instructions, such as embodied in computer-readable program code logic means, for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s).

From the discussion herein it will be appreciated that the invention can be embodied in various ways, including the following:

1. An apparatus for controlling automatic focus, comprising: (a) a computer processor configured for controlling an imaging device and associated focus control element; (b) memory coupled to said computer processor; and (c) programming stored in said memory and executable by said computer processor for carrying out an autofocusing process comprising: (i) capturing object images; (ii) estimating depth between captured image pairs to arrive at a depth estimation; (iii) determining a weighted mean of depth estimations and variance which spans both past and present depth estimations; (iv) adjusting focus with a focusing movement performed in response to said weighted mean of the depth estimations; and (v) repeating steps (i) through (iv) until said variance reaches a value that indicates sufficient confidence that a proper focus position has been attained.

2. An apparatus according to embodiment 1, further comprising programming executable on said computer processor for carrying out steps comprising: determining that an excessive number of focusing movements has been performed; and terminating the autofocusing process at current focus position.

3. An apparatus according to embodiment 1, further comprising programming executable on said computer processor for carrying out steps comprising: determining that an excessive number of focusing movements has been performed; and assigning a large variance to the estimation result and continuing to execute autofocusing steps.

4. An apparatus according to embodiment 1, further comprising programming executable on said computer processor for carrying out steps comprising: determining that an excessive number of focusing movements has been performed; and discarding depth estimations and capturing another pair of object images from which to make another depth estimation and continue said autofocusing process.

5. An apparatus according to embodiment 1, wherein focus is adjusted in response to each repetition of the autofocusing process by combining present and previous depth estimations instead of only utilizing recent depth estimations.

6. An apparatus according to embodiment 1, wherein said depth estimation is performed between captured image pairs, each image of which is taken at a different focus position, and estimating actual depth based on determining an amount of blur difference between captured images within the image pair.

7. An apparatus according to embodiment 1, wherein said depth estimation is performed using maximum likelihood estimation (MLE) of subject depth.

8. An apparatus according to embodiment 1, wherein said depth estimation is determined in response to a weighted mean d given by, $$\bar{d} = \frac{\sum_{i=1}^{N}\left(\frac{d_i}{\sigma_i^2}\right)}{\sum_{i=1}^{N}\left(\frac{1}{\sigma_i^2}\right)}$$

in which N represents the number of lens movements during the autofocus process, $d_i$ is depth estimation from ith image pair and $\sigma_i^2$ is variance for $d_i$.

9. An apparatus according to embodiment 1, wherein said variance comprises a measure of confidence, which is generated by said programming executable on said computer processor in response to consideration of all depth estimations made during said autofocusing process.

10. An apparatus according to embodiment 1: wherein said variance comprises a measure of confidence, which is generated by said programming executable on said computer processor, in response to depth estimations which are predicted during said autofocusing process; and wherein said variance is determined as a weighted mean $\sigma_{\bar{d}}^2$ given by, $$\sigma_{\bar{d}}^2 = \frac{1}{\sum_{i=1}^{N}\left(\frac{1}{\sigma_i^2}\right)}$$

in which N represents number of unbiased depth estimations performed during said autofocusing process and $\sigma_i^2$ is variance for ith depth estimation.

11. An apparatus according to embodiment 1, wherein said apparatus is a component of a still image camera.

12. An apparatus for electronically capturing images, comprising: (a) an imaging device; (b) a focus control element coupled to said imaging device and providing a focal range to said imaging device; (c) a computer processor coupled to the imaging device and said focus control element; (d) memory coupled to said computer processor; and (e) programming stored in said memory and executable on said computer processor for carrying out an autofocusing process comprising: (i) capturing object images; (ii) estimating depth between captured image pairs to arrive at a depth estimation; (iii) determining a weighted mean of depth estimations and determining variance across present and past collected image pairs; (iv) adjusting focus in response to said weighted mean of the depth estimations; and (v) repeating steps (i) through (iv) in the autofocusing process until said variance reaches a value indicating that sufficient confidence in proper focus has been attained.

13. An apparatus according to embodiment 12, wherein said apparatus is a component of a still image camera.

14. An apparatus according to embodiment 12, wherein said programming executable on said computer processor is configured for estimating depth between captured image pairs in response to a focus matching model which is based on blur differences determined in response to contrast changes detected as subject distance of an object whose image is being captured changes through at least a portion of the focal range of the imaging device.

15. An apparatus according to embodiment 12, wherein said programming executable on said computer processor is configured for discontinuing the autofocusing process in response to determining that said autofocusing process has been executed an excessive number of times.

16. An apparatus according to embodiment 12, wherein said programming executable on said computer processor is configured for assigning a large value to said variance when it is determined that said autofocusing process has been performed an excessive number of times without said variance reaching a predetermined threshold value.

17. An apparatus according to embodiment 12, wherein said programming executable on said computer processor is configured for discarding the present depth estimate and capturing an additional pair of object images from which to make a depth estimation, when it is determined that said autofocusing process has been performed an excessive number of times without said variance reaching a predetermined threshold value.

18. A method of automatically adjusting camera focus, comprising: (a) capturing a first object image by a camera device; (b) capturing an additional object image by the camera device; (c) estimating depth between captured image pairs in response to inputting blur difference values between captured object images into a focus matching model which is solved to generate a depth estimation; (d) determining the weighted mean of depth estimates and variance across past and present depth estimates; (e) adjusting camera focus position with a camera focusing movement within an autofocusing process in response to said weighted mean of the depth estimations; and (f) repeating steps (b) through (e) until said variance reaches a value indicative of sufficient confidence in achieving a proper focus for the camera device.

19. A method according to embodiment 18, wherein said method is carried out in a still image camera.

20. A method according to embodiment 18, further comprising: determining that an excessive number of focusing movements have been performed; and altering the autofocusing process by performing an action as selected from a group of actions consisting of: terminating the autofocusing process at the present focus position; assigning a large value to variance and continuing said autofocusing process; and discarding present depth estimates and capturing one or more additional object images from which to make a new depth estimation.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for controlling automatic focus, comprising:
   (a) a computer processor configured for controlling an imaging device and associated focus control element;
   (b) memory coupled to said computer processor; and
   (c) programming stored in said memory and executable by said computer processor for carrying out an autofocusing process comprising:
      (i) capturing object images;
      (ii) estimating depth between captured image pairs to arrive at a depth estimation;
      (iii) determining a weighted mean of depth estimations and variance which spans both past and present depth estimations;
      (iv) adjusting focus with a focusing movement performed in response to said weighted mean of the depth estimations; and
      (v) repeating steps (i) through (iv) until said variance reaches a value that indicates sufficient confidence that a proper focus position has been attained.

2. An apparatus as recited in claim 1, further comprising programming executable on said computer processor for carrying out steps comprising:
   determining that an excessive number of focusing movements has been performed; and
   terminating the autofocusing process at current focus position.

3. An apparatus as recited in claim 1, further comprising programming executable on said computer processor for carrying out steps comprising:
   determining that an excessive number of focusing movements has been performed; and
   assigning a large variance to the estimation result and continuing to execute autofocusing steps.

4. An apparatus as recited in claim 1, further comprising programming executable on said computer processor for carrying out steps comprising:
   determining that an excessive number of focusing movements has been performed; and
   discarding depth estimations and capturing another pair of object images from which to make another depth estimation and continue said autofocusing process.

5. An apparatus as recited in claim 1, wherein focus is adjusted in response to each repetition of the autofocusing process by combining present and previous depth estimations instead of only utilizing recent depth estimations.

6. An apparatus as recited in claim 1, wherein said depth estimation is performed between captured image pairs, each image of which is taken at a different focus position, and estimating actual depth based on determining an amount of blur difference between captured images within the image pair.

7. An apparatus as recited in claim 1, wherein said depth estimation is performed using maximum likelihood estimation (MLE) of subject depth.

8. An apparatus as recited in claim 1, wherein said depth estimation is determined in response to a weighted mean $\bar{d}$ given by, $$\bar{d} = \frac{\sum_{i=1}^{N}\left(\frac{d_i}{\sigma_i^2}\right)}{\sum_{i=1}^{N}\left(\frac{1}{\sigma_i^2}\right)}$$

in which N represents the number of lens movements during the autofocus process, $d_i$ is depth estimation from ith image pair, and $\sigma_i^2$ is variance for $d_i$.

9. An apparatus as recited in claim 1, wherein said variance comprises a measure of confidence, which is generated by said programming executable on said computer processor in response to consideration of all depth estimations made during said autofocusing process.

10. An apparatus as recited in claim 1:
   wherein said variance comprises a measure of confidence, which is generated by said programming executable on said computer processor, in response to depth estimations which are predicted during said autofocusing process; and
   wherein said variance is determined as a weighted mean $\sigma_{\bar{d}}^2$ given by, $$\sigma_{\bar{d}}^2 = \frac{1}{\sum_{i=1}^{N}\left(\frac{1}{\sigma_i^2}\right)}$$

in which N represents number of unbiased depth estimations performed during said autofocusing process and $\sigma_i^2$ is variance for the ith depth estimation.

11. An apparatus as recited in claim 1, wherein said apparatus is a component of a still image camera.

12. An apparatus for electronically capturing images, comprising:
   (a) an imaging device;
   (b) a focus control element coupled to said imaging device and providing a focal range to said imaging device;
   (c) a computer processor coupled to the imaging device and said focus control element;
   (d) memory coupled to said computer processor; and
   (e) programming stored in said memory and executable on said computer processor for carrying out an autofocusing process comprising:
      (i) capturing object images;
      (ii) estimating depth between captured image pairs to arrive at a depth estimation;
      (iii) determining a weighted mean of depth estimations and determining variance across present and past collected image pairs;
      (iv) adjusting focus in response to said weighted mean of the depth estimations; and
      (v) repeating steps (i) through (iv) in the autofocusing process until said variance reaches a value indicating that sufficient confidence in proper focus has been attained.

13. An apparatus as recited in claim 12, wherein said apparatus is a component of a still image camera.

14. An apparatus as recited in claim 12, wherein said programming executable on said computer processor is configured for estimating depth between captured image pairs in response to a focus matching model which is based on blur differences determined in response to contrast changes detected as subject distance of an object whose image is being captured changes through at least a portion of the focal range of the imaging device.

15. An apparatus as recited in claim 12, wherein said programming executable on said computer processor is configured for discontinuing the autofocusing process in response to determining that said autofocusing process has been executed an excessive number of times.

16. An apparatus as recited in claim 12, wherein said programming executable on said computer processor is configured for assigning a large value to said variance when it is determined that said autofocusing process has been performed an excessive number of times without said variance reaching a predetermined threshold value.

17. An apparatus as recited in claim 12, wherein said programming executable on said computer processor is configured for discarding the present depth estimate and capturing an additional pair of object images from which to make a depth estimation, when it is determined that said autofocusing process has been performed an excessive number of times without said variance reaching a predetermined threshold value.

18. A method of automatically adjusting camera focus, comprising:
(a) capturing a first object image by a camera device;
(b) capturing an additional object image by the camera device;
(c) estimating depth between captured image pairs in response to inputting blur difference values between captured object images into a focus matching model which is solved to generate a depth estimation;
(d) determining the weighted mean of depth estimates and variance across past and present depth estimates;
(e) adjusting camera focus position with a camera focusing movement within an autofocusing process in response to said weighted mean of the depth estimations; and
(f) repeating steps (b) through (e) until said variance reaches a value indicative of sufficient confidence in achieving a proper focus for the camera device.

19. A method as recited in claim 18, wherein said method is carried out in a still image camera.

20. A method as recited in claim 18, further comprising:
determining that an excessive number of focusing movements have been performed; and
altering the autofocusing process by performing an action as selected from a group of actions consisting of:
terminating the autofocusing process at the present focus position;
assigning a large value to variance and continuing said autofocusing process; and
discarding present depth estimates and capturing one or more additional object images from which to make a new depth estimation.

* * * * *